(12) United States Patent
Saliba et al.

(10) Patent No.: US 7,149,049 B2
(45) Date of Patent: *Dec. 12, 2006

(54) OPTICAL APPARATUS FOR TRACKING A MAGNETIC TAPE

(75) Inventors: George A. Saliba, Northboro, MA (US); Hong Chen, Worcester, MA (US); Joseph Panish, Littleton, MA (US); Leo Cappabianca, Worcester, MA (US); Richard Gulbankian, Marlboro, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/445,279

(22) Filed: May 23, 2003

(65) Prior Publication Data
US 2004/0042115 A1    Mar. 4, 2004

(51) Int. Cl.
*G11B 5/584*    (2006.01)

(52) U.S. Cl. .................................................. 360/77.12
(58) Field of Classification Search .................... None
See application file for complete search history.

(56) References Cited

U.S. PATENT DOCUMENTS 6,246,535 B1 *   6/2001   Saliba et al. ............. 360/77.12

* cited by examiner

*Primary Examiner*—Hoa T. Nguyen
*Assistant Examiner*—Mitchell Slavitt
(74) *Attorney, Agent, or Firm*—Morrison & Foerster LLP (57) ABSTRACT

An optical tracking system is presented which aligns a recording head with a magnetic tape. The system relies on an optically detectable servo track on the back of the tape. The servo track is formed by repeatedly engraving, at spaced intervals, three co-linear marks perpendicular to the length of the tape. Laser light reflects off the marks, and passes through a ball lens that directs the reflected light on to separate light detectors, one for each mark. By recording characteristics of the reflected light, the detectors transmit information to the system that permits the recording head to be properly aligned with the tape.

1 Claim, 5 Drawing Sheets

Optical Path of the Reflected Beams

OPTICAL APPARATUS FOR TRACKING A MAGNETIC TAPE

REFERENCE TO RELATED APPLICATION

The present invention is related to commonly assigned, co-pending U.S. patent application Ser. No. 09/046,723, entitled "Multi-Channel Magnetic Tape System Having Optical Tracking Servo", and filed 24 Mar. 1998, the disclosure thereof being incorporated herein by reference.

FIELD OF THE INVENTION

The invention relates to systems and methods for tracking movement of a magnetic tape, and more specifically, to optical servo head assemblies that can transmit and receive light patterns suitable for monitoring an optical servo track carried on a magnetic tape to sense and detect lateral movement of the tape.

BACKGROUND OF THE INVENTION

Digital tape-recording remains a viable solution for storage of massive amounts of data. Conventionally, at least two approaches are employed for recording of digital information onto magnetic recording tape. One approach calls for moving the tape past a rotating head structure which records and plays back user information from discontinuous transverse tracks. Interactive servo systems are employed to synchronize rotation of the head structure with travel of the tape. Another approach is to draw the tape across a non rotating head at a considerable linear velocity. This approach is sometimes referred to as linear "streaming" tape recording and playback.

Increased data storage capacity, and retrieval performance, is being required of all commercially viable mass storage devices and media. In the case of linear tape recording a popular trend is toward multi head, multi-channel fixed head structures with narrowed recording gaps and track widths so that many linear tracks may be achieved on a tape medium of predetermined width, such as one-half inch width tape. Tape substrates are also being made thinner, with increased tape lengths being made possible in small diameter reel packages.

Because of relatively high linear tape velocity, and because tape substrates continue to be made progressively thinner, guiding tape past a tape head structure along an accurate invariant linear path has proven to be difficult problematical. One error phenomena is known as "lateral tape motion" or "LTM." LTM is a major source of tracking errors in linear tape recording. One approach to minimizing LTM tracking errors is to provide a multi-roller tape guide structure, such as the type described in commonly assigned U.S. Pat. No. 5,414,585, entitled Rotating Tape Edge Guide, the disclosure thereof being incorporated herein by reference. While this approach has provided a viable "open loop" solution to LTM, with the advent of new head technologies, such as magneto-resistive read heads, and new higher coercivity recording media, track widths may be very small, and many additional tracks may be defined on the tape. Unfortunately, a limiting factor is LTM, and at some track width dimension and track density, it is not possible to follow the tape accurately enough to provide reliable performance.

One proposed solution for preventing errors arising from LTM is set forth in the above-identified patent application entitled "Multi-Channel Magnetic Tape System Having Optical Tracking Servo." As disclosed therein, an optical servo mechanism can be employed to track and monitor lateral motion of a magnetic tape relative to a recording head. To this end, the magnetic tape can be provided with an optically detectable servo track that can be detected by an optical pick up head that projects a beam of light onto the servo track and detects light reflected back from the servo track. This optical servo system provides a mechanism that can employ narrow servo tracks that can be detected by a beam of light to provide fine positioning information for aligning a recording head with a magnetic track that has a known spatial relationship to the optically detectable servo track also recorded onto the magnetic tape.

Today, optical pick-up heads exist for reading optical tracks recorded onto CD ROMS. However, these existing systems typically include multiple component lens assemblies that are employed for focusing a light generated by a light source onto the optical servo track of the CD ROM. Although these multiple component optical assemblies can work well, they often require the optical pick up head to have a focal length that is too long to allow for employment with a magnetic recording head, which benefits from close proximity to the magnetic recording media. Additionally, these multi-component lens assemblies can add to the weight of the optical pick up head, which is undesirable in an application where the pick up head is to be moved in real time with the changing position of a servo track. Additionally, the lens assemblies can add to the expense of manufacture, requiring careful alignment of the lens components to provide an optical path and focal point of desired parameters.

Accordingly, there is a need in the art to provide an optical pick up head, or optical servo head, that is light weight, easy to manufacture, and provides a focal length that is suitable for use with a magnetic recording head that benefits from close proximity to the recording media.

SUMMARY OF THE INVENTION

The systems and methods described herein provide optical servo heads capable of transmitting and receiving at least one beam of light that can be employed for sensing the presence of an optically detectable servo track that is recorded onto a recording media, such as a magnetic tape. In one embodiment, the optical servo head comprises a semiconductor device that emits and receives a diffracted pattern of laser light, and a lens assembly that focuses the emitted light to a spot size, or spot sizes, suitable for detecting the optically detectable servo track that has been placed onto the recording media. The lens assembly can include a spherical lens element that is disposed between two walls, each of the walls having an aperture extending therethrough. The apertures and the spherical lens cooperate to focus the emitted light into a pattern that is suitable for detecting the optical servo track, and cooperate to focus light reflected back from the servo track onto a photo-detector device that can generate a signal that is representative of the presence of reflected light having impinged on the optical servo track.

The systems and methods described herein provide optical servo heads that employ a focusing assembly with reduced complexity, a short focal length and which are sufficiently compact and lightweight to be employed with a servo mechanism that operates to move the optical servo head in real-time. Additionally, the employment of a spherical lens eliminates the need to carefully align conventional lens elements, and thereby reduces the cost of manufacturing.

Other objects and advantages of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

To provide an overall understanding of the invention, certain illustrative embodiments will now be described, including an optical servo head for tracking an optical servo track formed on a magnetic tape. However, it will be understood by one of ordinary skill in the art that the optical servo heads described herein can be adapted and modified to provide systems that can act as servo heads for monitoring tracks on other media, including CD ROMs, floppy disks, hard disk platters, or for any other suitable application. Other additions and modifications can be made to the invention without departing from the scope hereof.

Figure 1:
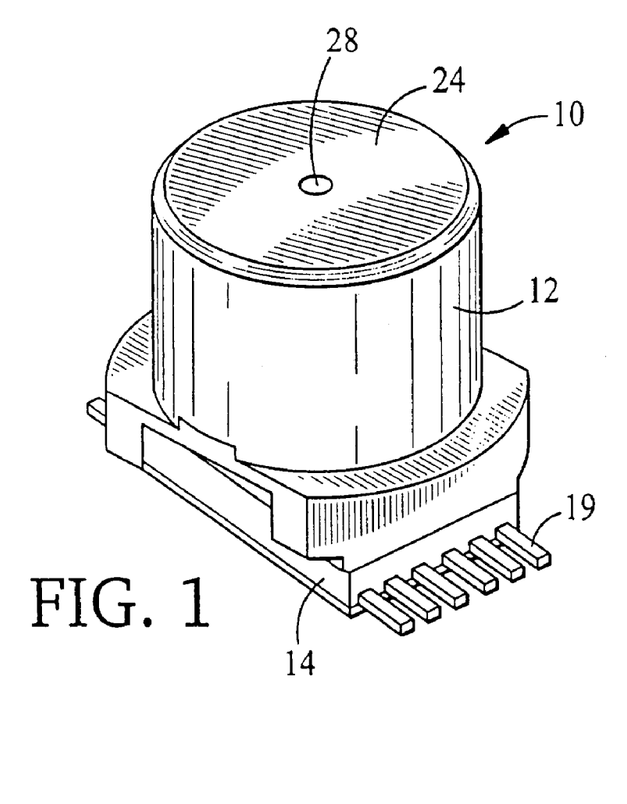
FIG. 1 depicts one optical servo head according to the invention.

FIG. 1 depicts one embodiment of an optical servo head for tracking an optically manifested servo track. As shown in FIG. 1 the system 10 includes a housing 12, a semiconductor device 14 mounted to the housing 12, and a sidewall 24 formed at one end of the housing 12 and having an aperture 28 extending therethrough. The depicted optical servo head 10 is sufficiently compact and small to be carried on a servo mechanism that is being rapidly moved over the surface of a recording media. In one embodiment, the optical servo head 10 is approximately 4 millimeters in height and 3 millimeters in width. However, it will be understood by one who is skilled in the art that the size and geometry of the optical servo head 10 can be varied according to the requirements of the application.

Figure 2:
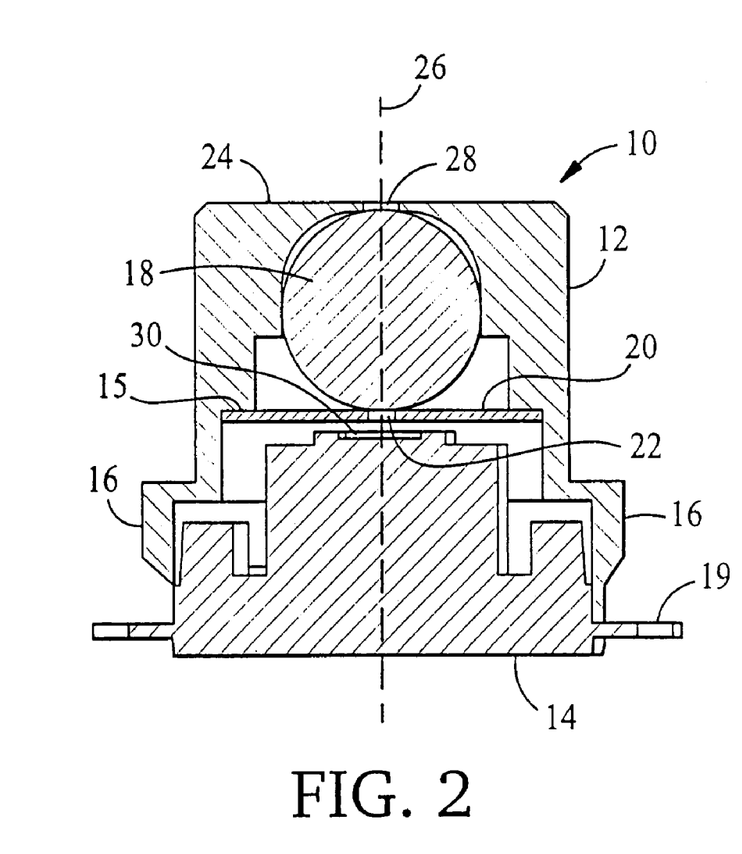
FIG. 2 provides a cross-sectional view of the optical servo head depicted in FIG. 1.

The components of the optical servo head 10 are shown in more detail in FIG. 2, which provides a cross-sectional view of the optical servo head 10. More particularly, FIG. 2 depicts an optical servo head 10 that includes a housing 12, a semiconductor device 14, a spherical lens 18, electrical leads 19, a sidewall 20, an aperture 22, a sidewall 24, an aperture 28, and a laser light source 30.

The housing 12, lens 18 and the apertured sidewall 20 can be assembled together to provide a lens assembly that can be mounted onto the semiconductor device 14. To this end, the housing 12 can be a plastic body that is designed to "snap-onto" or frictionally engage with the semiconductor device 14. Optionally, the housing 12 can be glued onto the semiconductor device 14. In the depicted embodiment, an interior wall of the cavity 12 has a concave shape that is adapted for receiving the spherical lens element 18. In the embodiment shown in FIG. 2, the spherical lens element 18 frictionally engages into the housing 12 and is held in place by the concave sidewall. Optionally, the spherical lens 18 can be glued to the concave sidewall for fixing the spherical lens 18 within the housing 12. The sidewall 20 can be a plastic sheet that sits against an annular shoulder 15 and thereby spans across the open end of the housing 12. The sidewall has an aperture 22 that is located within the sidewall 20 such that when the lens 18 and sidewall 20 are assembled within the housing 12, the apertures 20 and 28 are aligned along the depicted optical path 26 that extends through semiconductor device 14 and through the central axis of the spherical lens 18.

In the embodiment depicted in FIG. 1, the emission and reception of light is performed by the semiconductor device 14 that includes a laser light source 30 that can emit a beam, or beam pattern, that can be employed for tracking the servo track. One such semiconductor device is described U.S. Pat. No. 5,729,519, the teachings of which are incorporated by reference herein. It is understood that the semiconductor device described in the above cited US patent is embodied in the HUL7001 device that is manufactured and sold by the Matsushitu Company of Takatsuki Japan. The semiconductor device 14 acts to emit and receive a pattern of light that can be focused onto the surface of the tape 44 to provide a selected pattern of spots. The pattern of spots provided by the semiconductor device 14 can correspond to a characteristic of the optically detectable servo track carried on the tape 44. For example, the semiconductor device 14 can provide a beam configuration that can be focused onto the tape 44 to provide a pattern of spots that corresponds to spatial characteristic of the optically detectable servo track, such as by providing a pattern of spots that when focused onto the magnetic tape 44 forms a pattern that will overlay completely, or selected portions of a pattern of marks carried on the tape 44 which act as a servo track.

In alternative embodiments, the optical servo system 10 can include other elements and devices for carrying out the emission and reception of light. These can include emission and reception devices that comprise an assembly of discrete optical elements, as well as other semiconductor devices, or hybrid devices. In further alternative embodiments, the optical servo heads can include separate devices for emitting and receiving light, as well as separate devices for emitting and receiving each of the separate beams. Moreover, the optical servo heads can include light emission and reception devices that include filters, anti-glare coatings, multiple light sources and integrated focusing elements. Accordingly, it will be understood by one of ordinary skill in the art that the optical servo heads described herein can employ any suitable device for emitting and receiving light for detecting an optical servo track and that the optical servo heads described herein are not to be limited to any particular device or system.

The optical servo head 20 acts as a transducer that provides an control signal, typically an error signal. To this end the emission and reception system of the depicted embodiment can be coupled directly into an electrical circuit. Specifically, FIG. 2 illustrates that the semiconductor device 14 provides the optical servo head 10 with a plurality of electrically conductive leads that can be coupled into an electronic circuit, such as an electronic servo-loop circuit that processes signals generated by the optical servo head 10 to align a recording head with data tracks on a magnetic tape.

The spherical lens 18 depicted in FIG. 2 is a substantially spherical solid body comprised of a material having a high refractive index. In one embodiment, the spherical lens 18 comprises a sapphire ball lens having an index of refraction of approximately 1.77 in the wavelength of 770 nm. One such sapphire ball lens is a 4 mm. sapphire ball lens of the type sold by the Edmund Scientific Company In an alternative embodiment the lens 18 can comprise a ball lens formed of LASPN9 glass. Other suitable materials will be apparent to one of ordinary skill in the art of optical engineering, and the materials selected for forming the lens 18 can depend, in part, on the application and on the design parameters of that application. Moreover, it will be understood that depending upon the application, in alternative embodiments of the invention, the spherical lens 18 can be replaced by, or used in concert with, other optical elements, such as an optical assembly of aspherical lenses, Fresnel lenses, diffractive optical elements or any other suitable optical component. Optionally, the spherical lens 18 can also have a coating of an antireflective material to reduce the likelihood that light emitted from the laser source 30 will be directly reflected back from the lens 18 to the semiconductor 14. Any suitable antireflective coating can be employed, including those conventioanlly employed with optical servo mechanisms.

The employment of a spherical lens 18 reduces the expense and time of manufacturing the optical servo 10 by eliminating any alignment steps which would be necessary in aligning any aspherical or objective lens that could be employed within an alternative lens assembly to provide the desired optical path. As can be seen from FIG. 2, the spherical geometry, and symmetric characteristics of the spherical lens 18 allows the spherical lens 18 to be seated within the cavity of the housing 12 without requiring a step of aligning the spherical lens 18 within the housing 12.

Figure 3:
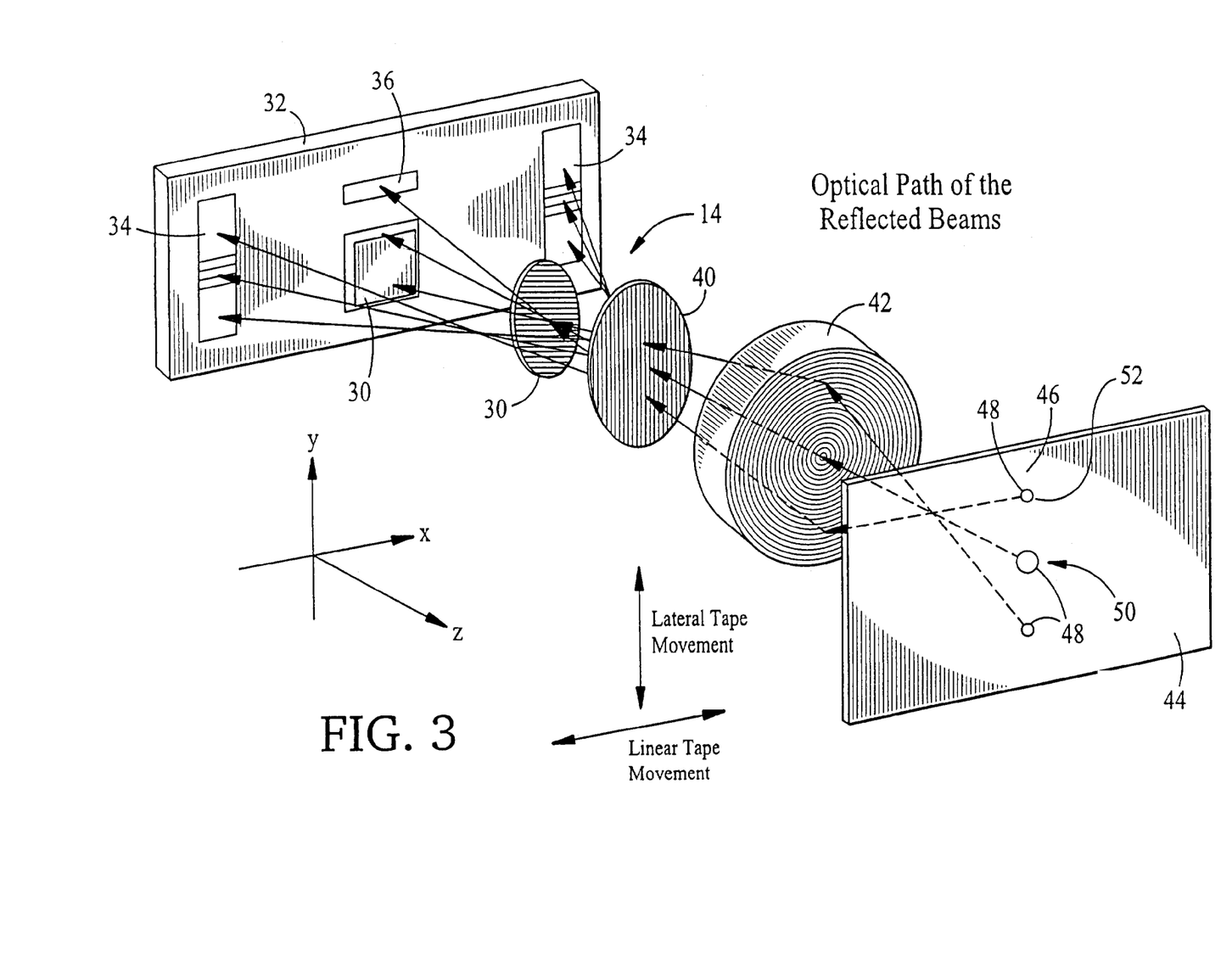
FIG. 3 is a functional diagram of a tape having optically detectable mark and of the optical servo head depicted in FIG. 1.

Turning now to FIG. 3, one operation of the optical servo head 10 is depicted. Specifically, FIG. 3 graphically illustrates the optical servo head 10 receiving light that has been reflected from a servo track. FIG. 3 depicts the semiconductor device 14, a first grating 38, a second grating 40, a cross section 42 of the spherical lens 18, a portion of a magnetic tape 44, and a pattern 46 of marks 48 that is projected on the magnetic tape 44 by the optical servo head 10. Not shown in FIG. 3 are the apertures 20 and 28, however the effect of the apertures is depicted by representing the spherical lens 18 as a cylindrical section 42. This representation arises from the understanding that the apertures 20 and 28 block a portion of the beam configuration emitted from the laser source 30, so that only the central portion of the spherical lens 18 passes emitted light.

The functional block depiction of the semiconductor device 14 includes a substrate surface 32 that carries thereon the laser light source 30, photo-detectors 34, and a power detector 36. The power detector 36 can provide a measure of the intensity of the reflected light that can be employed by the servo system to maintain a constant intensity of laser light being generated by the emission/reception device. Optionally, the signal generated by the power detector 36 can be employed for varying the power provided to the laser light source. FIG. 3 shows as separate elements the substrate 32 and the gratings 38 and 40, however, it will be understood that the substrate 32 and the gratings 38 and 40 can be incorporated as part of a single semiconductor device. Such an assembly of gratings and substrate is described in detail in U.S. Pat. No. 5,729,519, the teachings of which have been previously incorporated by reference herein.

The depicted magnetic tape 44 carries a set 50 of three marks 52 (shown in outline), which can be permanent marks that are spaced transversely across the surface of the tape 44. In FIG. 3 the marks 52 are shown in outline, however it will be understood that the marks 52 can be substantially solid circular marks, such as marks that can be formed by ultraviolet laser engraving a carbon black surface of a magnetic tape to form pits in the carbon black surface that are several microns in diameter and capable of reflecting back the light emitted by the optical servo head 10. In FIG. 3, only one set 50 of three marks is shown, however, it will be understood that other sets of marks can be spaced longitudinally along the full length of the tape 44 to provide an optical servo track that can be monitored and tracked by the optical servo system. Additionally, it will be understood that multiple tracks can be formed on the back surface of the tape, such that a plurality of optically detectable servo tracks can be formed on the tape 44 and can extend along the entire length of the tape 44. The tape 44 can move linearly in the direction of linear motion shown by FIG. 3 such that the optical servo track are carried linearly across the front of optical head 10. As the optical servo track moves by the head 10, the head 10 can activate the laser light source 30 to generate a beam of laser light for striking against the tape 44. The laser light emitted by the laser light source 30 passes through the diffraction grating 38 which diffracts the light into a diffraction pattern that includes a zero order beam and a plurality of higher order beams. The diffracted beam, or a portion of the diffracted beam, passes through the grating 40, which is aligned 90 degrees out of phase with the diffraction grating 38, and which has a finer grating pattern than the grating 38. The diffraction grating 40 diffracts the oncoming beam to provide a two dimensional diffraction pattern that includes a zero order beam and a plurality of higher order beams. The pattern emitted from the grating 40 is configured and focused by the apertures and spherical lens into a multibeam configuration that includes a zero order beam and two first order beams, both of which first order beams travel along an axis that is transverse to the axis along which the zero order beam travels. For the depicted embodiment, the apertures 20 and 28 are dimensioned to block beams higher than the first order. Accordingly, for this embodiment, only the zero order beam and the two first order beams will pass through the apertures and the lens 18. The lens 18 focuses the three beams for striking against the surface of the tape 44 in a pattern that is suited for detecting the pattern of marks 52 formed on the tape 44.

If the tape 44 is aligned with the servo head 10, then the three beams emitted from the head 10 will impinge upon the three marks 52 and reflect back toward the head 10. In the depicted embodiment, the diffraction pattern projected onto the tape 44 is selected to fall onto the marks 52 so that the main beam of the pattern falls squarely onto the center mark, and one first order beam falls on the upper half of the upper mark of the pattern 50 and the second first order beam falls on the lower half of the lower mark in the pattern 50. The reflected laser light then retraces its path through the lens 18, the grating 40 and the grating 38. In the depicted embodiment, the grating 40 has a fine grating pattern with respect to the wavelength of the reflected light, and provides relatively large diffraction angles, as shown by FIG. 3. As the light passes through the gratings 40 and 38, the light is again diffracted into a pattern, and the photodetectors 34 are located on the substrate 32 at positions that correspond to the location of nodes of the diffraction pattern being passed through to the substrate 32 by the diffraction grating 38. The photodetectors 34 are each capable of generating a signal that represents the intensity or presence of the light impinging on the photodetectors 34.

For a properly aligned tape 44, both the upper and lower marks of the pattern 46 will reflect an equal intensity of light back to a respective one of the photodetectors 34. For a tape that has moved laterally relative to the optical servo head 10, and therefore is now out of alignment, the diffraction pattern emitted from the optical servo head 10 will fail to align with the pattern of marks 50 on the tape 44, and the photodetectors 34 will measure different levels of intensity. For example, if the tape moves laterally upward relative to the optical servo head 10, the upper mark 52 of the pattern 50 will move upward, bring itself further into the spot 48 of the first order beam that, when properly aligned, impinges on only the upper half of the mark 52. Simultaneously, the lower mark 52 of the pattern 50 will also move upward, thereby moving itself away from the spot 48 of the first order beam that, when properly aligned, impinges on the lower half of the mark. Accordingly, the upper mark 52 of the pattern 50 will reflect more light back to the optical servo head 10 and the lower mark 52 will reflect less light back to the optical servo head 10 and one photo-detector 34 will measure a corresponding increase in reflected light intensity and one photo-detector 34 will measure a corresponding decrease in reflected light intensity. This provides a push-pull control signal that allows the system to sense lateral movement of the tape 44 that is less than the diameter of a mark 52. Accordingly, the systems described herein can detect lateral movement of the tape that is less than a micron.

In an optional embodiment, the set 50 of marks 52 can be aligned along an offset axis, such as by being aligned along an axis that is tilted about 7° relative to an axis that extends perpendicular to direction of linear tape movement. This provides a set of marks that includes a leading mark and a lagging mark which will provide phase information and thus allows the optical servo head to detect the direction of travel of the tape 44. As discussed above the optical servo head 10 can project spots onto portions of the tilted marks to employ a push-pull detection system and achieve fine control over the head/tape alignment. Additionally, it will be understood that the optical servo head can be employed for providing tape speed information. Specifically, as the pitch of sets of marks on the tape 44 is a fixed known value, and as the sets of marks can extend along the full length of the tape 44, the detection information provided by the optical head 10 provides a measure of the rate at which the sets of marks are passing in front of the optical servo head 10. Accordingly, the optical servo 10 can detect that sets of marks are passing in front of the tape at approximately 33 Khz, which for a known pitch, can be translated into an inch/second tape rate.

In a further optional embodiment, the system can employ only the center mark, or any one mark, for determining the relative alignment of the head and the tape without employing the push-pull method. Other servo track detection techniques can be employed without departing from the scope of the invention. Additionally, in other optional embodiments, the optical servo head 10 can be employed to read information on the tape, either encoded on a separate track, or encoded within the servo track. For example, the optical track can be employed to provide information representative of the longitudinal location of the section of the tape adjacent the read/write head. To this end, the tape can include encoded down-the-tape location information for indexing the longitudinal position of the tape. Additionally, the optical servo head can be employed for detecting information representative of the section of tape, or the band of tape being processed, for tapes that are subdivided into sections, such as bands of data. The optical servo head can also be employed for detecting cross-tape position information, or any other type of information that may be helpful to record or write onto the media.

Continuing with the example of the push-pull system, it is understood that the semiconductor device 14 can provide signals on the leads 19 that correspond to the increasing and decreasing intensity levels that arise when the tape 44 moves laterally. As described in the above mentioned US patent application "Multi-Channel Magnetic Tape System Having Optical Tracking Servo", these signals can be provided to differential servo control system that employs the difference between these two signals to adjust the position of the optical head 10 (and a recording head) relative to the position of the tape 44, thereby returning the tape 44, and the optical head 10 and the magnetic recording head to proper alignment.

Figure 4:
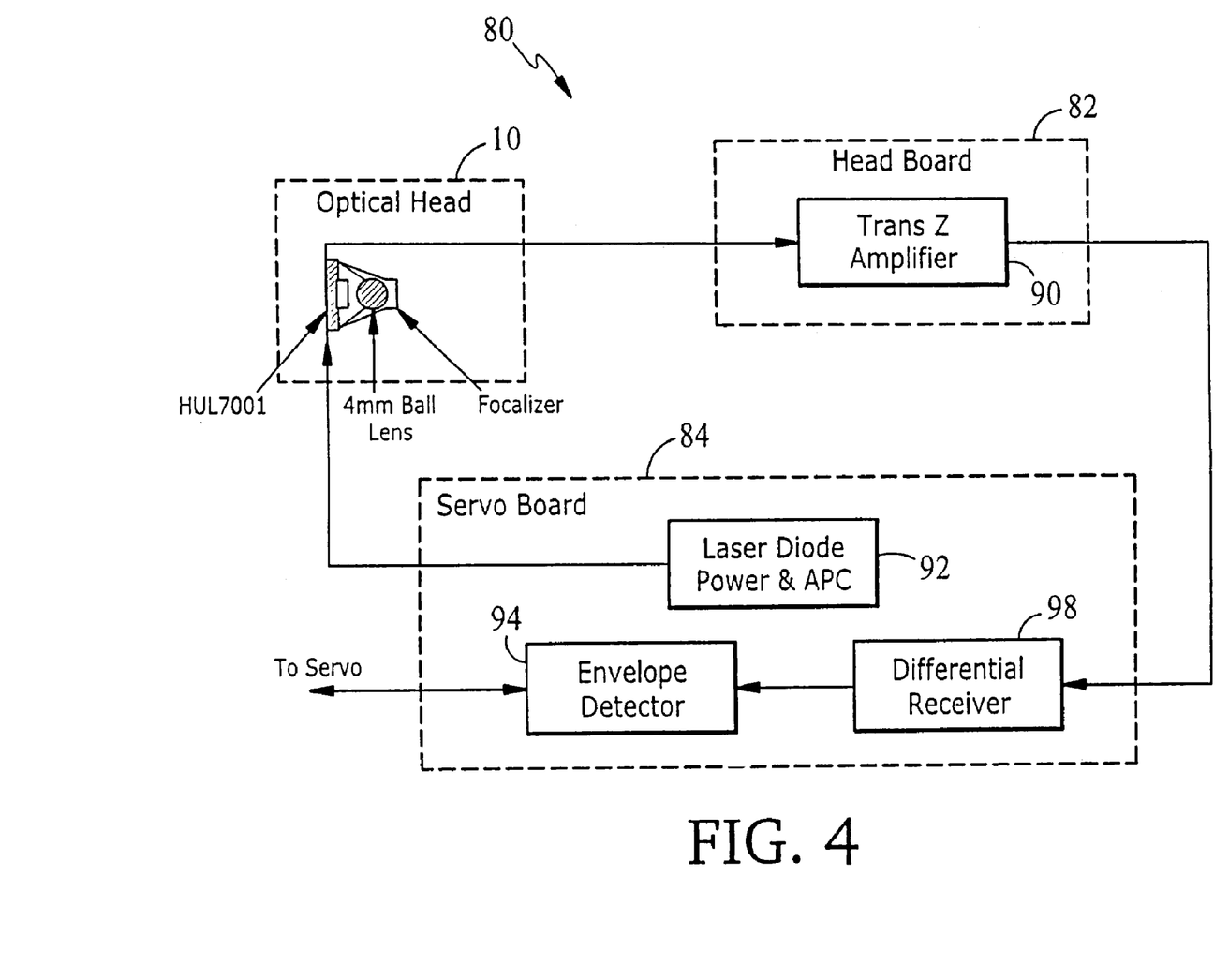
FIG. 4 is a functional block diagram of a servo-loop that includes an optical servo head such as that depicted in FIG. 1.

The functional block diagram provided by FIG. 4 illustrates one servo-system 80 suitable for use with the optical servo head 10 described above for aligning a recording head and a tape. As shown in FIG. 4, the servo system 80 can include the optical servo head 10, a head board 82, and a servo board 84. The illustrated system 80 is a conventional servo control system for reducing an error signal provided by a transducer that is monitoring a characteristic of a system, such as monitoring the alignment of a recording head with a recording medium. As shown, the servo system employs the head board 82 to provide an amplifier that can pre-amplify and condition the signals provided by the optical servo head 10. The conditioned signals are transmitted to the servo board 84 that includes a differential receiver 98 that generates a signal representative of the difference between the intensity measured by the photodetectors 34. This signal is passed to an envelop detector that processes the difference signal to generate a correction signal for correcting any difference in the measured intensity signals provided by the two photodetectors. The correction signal is employed to adjust the alignment of the optical servo head relative to the magnetic tape.

The differential amplifier system described above allows the system to respond to tracking errors that are less than the full width of one of the marks 52 of the servo track. As the diameter of the marks 52 can be in the range of 2 to 10 microns, the system servo system 80 described herein can respond to lateral movement of the magnetic tape 44 that is less than a micron. Accordingly, very fine control of alignment is provided. FIG. 4 further depicts a laser diode power and APC board 92. The board 92 can operate to provide power to the semiconductor 14 for driving the laser light source 30 thereon. The board 92 can operate to provide a consistent power level to the laser light source 30, or optionally can vary the power to the laser light source 30 according to a selected operating characteristic, such as temperature, of the system.

Optionally, the system 80 can also include a computer processor for processing the signal provided by the optical servo head to determine other characteristics of the moving tape, such as the direction of the tape, the speed of the tape, the longitudinal position of the tape, or any other such information. To this end, the system can include a microprocessor/microcontroller system, such as a 6805 based system that is programmed for processing the information collected by the optical servo head 10.

Figure 5:
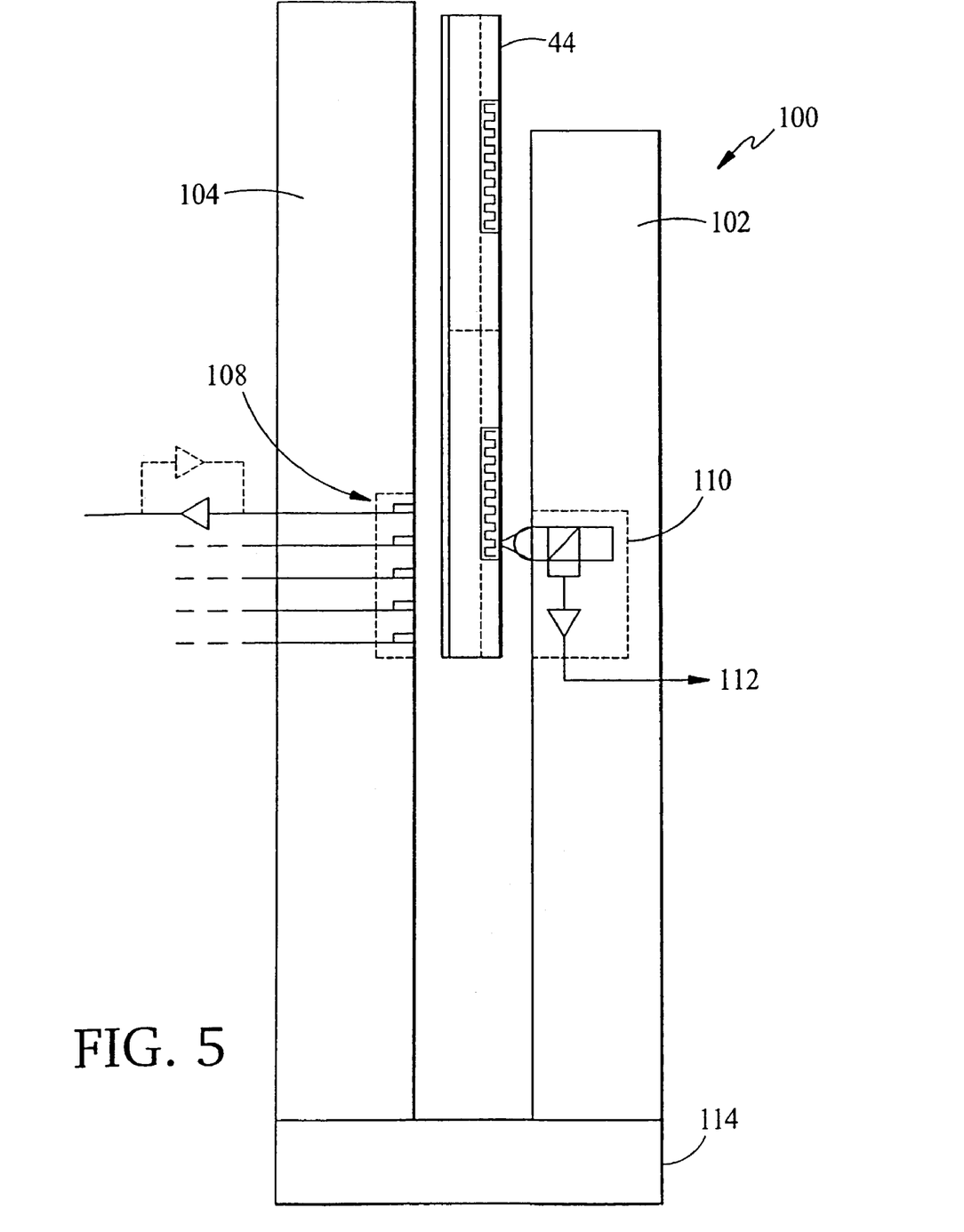
FIG. 5 depicts an isometric view of a read/write head having an optical servo head carried thereon.
Figure 6:
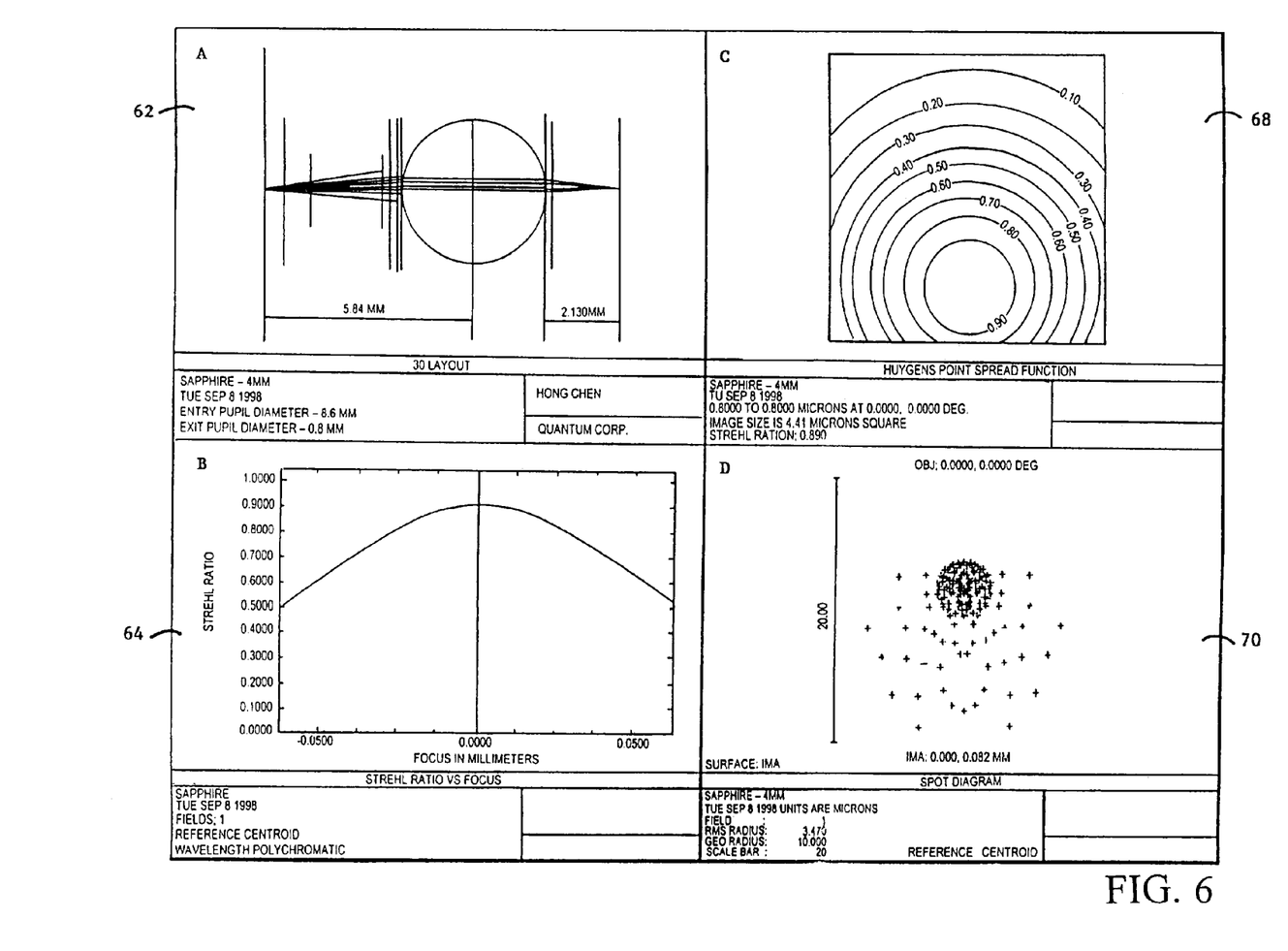
FIGS. 6A–6D depict characteristics of a laser light generated by an optical servo head such as that depicted in FIG. 1.

FIG. 5 depicts one embodiment of read/write head having an optical servo head for tracking an optically detectable servo track recorded on to a recoding media. Generally, FIG.

5 depicts the head carriage assembly for a magnetic tape recording and playback system capable of being translated laterally relative to a tape path, and being responsive to a fine positioning system and a coarse positioning system for maintaing a magnetic head structure adjacent to a tape path. Specifically, FIG. 5 depicts a read/write head 100 that includes a first arm 102, a second arm 104, a read/write substrate 108, an optical servo head 110, an alignment signal output 1112, and a cross-arm 112. FIG. 5 depicts the relationship between the magnetic head 108, shown as a read/write substrate, the optical servo head 110 and the tape 44. Specifically, the tape 44 sits in a gap formed between the arm 102 and 104. The arm 102 carries the optical servo head and disposes the optical servo head 110 adjacent one side of the tape 44. Similarly, the arm 104 carries the magnetic head 108 and disposes the substrate 108 adjacent to the recording side of the tape 44. The cross-arm 114 holds the arms 102 and 104 in a fixed relationship, so that the relative alignment of the optical servo head and the read/write substrate is known. Accordingly, the system 100 depicted in FIG. 5 maintains a data transfer mechanism, such as the read/write substrate 108, in a known spatial relationship with the optical servo head 110, thereby allowing for alignment of the data transfer mechanism responsive to a determination of the alignment of the optical servo head relative to the recording medium.

FIGS. 6A through 6D present simulation results developed employing a 4 mm sapphire lens as an example of the spherical lens 18. As discussed above, in connection with FIG. 3, the semiconductor device 14 can produces a series of IR laser beams. A combination of an entry aperture 22, a Sapphire ball lens (index of refraction: 1.77 in the wavelength of 780 nm) and an exit aperture 28 controls the beams configuration, spot sizing and spacing, and projects by finite-conjugate imaging three main beams (+1, 0 and −1 order beams) on the magnetic tape 44 with a pre-marked pattern. Reflected beams carried with tracking signal come back through the lens 18, are diffracted by the gratings 38 and 40, and then are detected by photo-detectors 32 in semiconductor device 14.

The characteristics of the lens assembly, including the index of refraction of the lens material, the positioning of the apertures, lens and magnetic tape relative to one another, and aperture width can be chosen to ensure a favorable focal length f, working distance w from the lens to the medium, and spot size of the laser beam. The focal length f of a spherical lens is given by:

$$f = nR/[2(n-1)] \quad (1)$$

where R and n are the radius and index of refraction of the lens being employed, respectively. The working distance w from lens to media can be estimated by the paraxial formula:

$$S_i = S_0 f \div (S_0 - f) \quad (2)$$

$$w = S_i - R \quad (3)$$

provided the principal planes are at the center of the sphere, where $S_0$ is the object distance from the virtual laser emitting point to the principal plane, and $S_i$ is the image distance from the principal point to the media surface. These equations establish a relation among the semiconductor device 14, lens assembly, and working distance, which provides a guideline in selection of the lens for a specific application.

In detecting tracking error signal, the spot size of laser beams focused on the media surface can be selected for the application as it determines, in part, the spatial accuracy of a tracking servo. The spot size for an optical system is generally limited by diffraction and aberrations. With a proper selection of the apertures and spherical lens 18, the spherical aberration is minimized to meet Marechal's criteria: Strehl ration >0.8. Therefore, the effective spot size (full width at half maximum, or FWHM) can be generallys determined by diffraction $$\sigma \cong 0.56 \lambda / NA \quad (4)$$

where NA is the image side numerical aperture. Accordingly, the depth of focus for the optical system can be determined by:

$$\delta \cong 0.8 \lambda / NA^2$$

For typical parameters $\lambda = 0.8$ μm and NA=0.1, we have a $\sigma \approx 4.5$ μm and $\delta \approx 64$ μm.

Although the aforementioned procedure helps determine preferable lens assembly characteristics, it will be understood by someone skilled in the art that other methods can be employed including the employment of commercially available ray tracing computer software such as Zemax, from Focus-software, Inc, to determine optimized parameters for the actual geometry and materials involved. A series of computer simulations by using Zemax was carried out during the design of an optical apparatus, including ray tracing for laser diode, gratings, apertures, ball lens, media and beams reflected back through the same optical path, finally detected by the photo-detectors. The Zemax simulation also includes: diffraction-limited spot size calculation by Huygens point spread function, strehl ratio, aberration, tolerance analysis, and optimization of laser beam intensity to achieve high signal level while controlling desirable laser beam spot size, and spacing. FIG. 6A–6D shows the simulation results for one embodiment with a 4 mm Sapphire ball lens. The upper left graph 6A shows the geometry of the apparatus. The working distance is about 2.13 mm, and the overall optical length is about 10 mm. The lower left graph 6B plots the strehl ratio against the focus. It is shown that the strehl ratio is 0.89 at the selected focusing point and depth of focus $\delta \cong 25$ μm (defined as the defocus when strehl ratio >0.8). The spot size (FWRM) of $\sigma \cong 4$ μm can be determined from the contour plot of Huygens point spread function as shown in the upper right graph 6c. By reducing the entry pupil size, the spot size will increase inverse-proportionally. The lower right graph 6d shows the relative position of the first order beam or spot spacing: 82 μm from the optical axis or the zero order beam.

As manufacturing and cost are of concern, employment of ball lenses has an advantage. It also reduces, or eliminates high tolerance and cost alignment process because of the high symmetry of a ball lens. The diameter of the ball lens and glass material generally determines the working spacing and overall optical path. The use of Sapphire ball lens with diameter from 2 mm to 6 mm gives a range of working spacing from 0.5 mm to 5 mm.

To reduced overall length of the apparatus, the ball lens is located close to the semiconductor device 14, leaving a spacing of 0.1~0.5 mm for a circular or rectangular entry aperture 22. The aperture controls the laser beam spot size focused on the media and blocks stray light. Its inner diameter (for circular aperture) or side-length for (square aperture) can be varied from 0.4 to 1.0 mm, depending on the diameter of desirable beam spot. Typically a diffraction-limited spot size of 3 μm~10 μm can be achieved, which is desirable for high-density magnetic recording. The exit aperture 28 adjacent to the lens 18 in the media side controls the number of laser beam spots on the media, preventing from projecting and/or collecting unwanted beams on the media to produce a fault signal.

Those skilled in the art will know or be able to ascertain using no more than routine experimentation, many equivalents to the embodiments and practices described herein For example, the systems and methods described herein can be employed with any type of recording media, including helical scan tape drives, single reel cartridge tapes, dual reel cartridge tapes, or any other recording media. Moreover, it will be understood that the systems described herein can also include optical recording devices for forming optically detectable servo tracks, or any other optically detectable indicia of information, on the recording media. For example, the read/write head that carries the optical servo bead can include a relatively small and lightweight laser, such as a 100 mW laser, for engraving a servo track onto a tape. It will also be understood that the optically detectable track can be placed on the backside, or non-recording side of a medium, as well as on the front side or recording side of a medium. It will also be understood that the systems described herein provide advantages over the prior art including the ability to employ spot sizes sufficiently small to allow substantial increases in the number of data tracks that can be recorded onto a recording medium. As well as by providing systems that can employ the non-recording side of a media for carrying servo information, thereby eliminating the need to consume space on the recording surface for carrying servo information.

Accordingly, it will be understood that the invention is not to be limited to the embodiments disclosed herein, but is to be understood from the following claims, which are to be interpreted as broadly as allowed under the law.

We claim:

1. An optical servo head for tracking an optically manifested servo track, comprising
    light source means for generating light along an optical path,
    detection means for detecting the presence of light generated from said light source means, and
    a lens assembly including a lens housing having a first wall and a second wall each having an aperture extending therethrough for providing an optical path through the housing, and a substantially spherical lens element dimensionally adapted for being disposed within said housing, whereby light emitted from said light source means is focused on the servo track by using a lens assembly and reflected back through said lens assembly and to said detection means.

* * * * *